(12) United States Patent
Lee et al.

(10) Patent No.: US 10,459,155 B2
(45) Date of Patent: Oct. 29, 2019

(54) BACKLIGHT MODULE AND DISPLAY DEVICE HAVING THE SAME

(71) Applicants:Radiant Opto-Electronics (Suzhou) Co.,Ltd., Jiangsu (CN); Radiant Opto-Electronics Corporation, Kaohsiung (TW)

(72) Inventors: Yu-Ju Lee, Kaohsiung (TW); Pei-Ling Kao, Kaohsiung (TW); Pei-Fen Hou, Kaohsiung (TW)

(73) Assignees: Radiant Opto-Electronics (Suzhou) Co., Ltd., Jiangsu (CN); Radiant Opto-Electronics Corporation, Kaohsiung (TW)

( * ) Notice: Subject to any disclaimer, the term of this patent is extended or adjusted under 35 U.S.C. 154(b) by 253 days.

(21) Appl. No.: 15/605,928

(22) Filed: May 25, 2017

(65) Prior Publication Data

US 2017/0371094 A1    Dec. 28, 2017

Related U.S. Application Data

(63) Continuation of application No. PCT/CN2016/090859, filed on Jul. 21, 2016.

(30) Foreign Application Priority Data

Jun. 28, 2016 (CN) .......................... 2016 1 0485641

(51) Int. Cl.
*F21V 8/00* (2006.01)
*F21V 17/10* (2006.01)
*G02B 6/00* (2006.01)

(52) U.S. Cl.
CPC .......... *G02B 6/0088* (2013.01); *F21V 17/101* (2013.01); *G02B 6/005* (2013.01)

(58) Field of Classification Search
CPC .... G02B 6/0088; G02B 6/005; G02B 6/0051; G02B 6/0053; F21V 2200/20; F21V 17/00; F21V 17/101
See application file for complete search history.

(56) References Cited

U.S. PATENT DOCUMENTS

| 9,268,085 | B2 * | 2/2016 | Huo | G02B 6/0088 |
| 2012/0257417 | A1 * | 10/2012 | Lee | G02B 6/005 362/622 |

(Continued)

FOREIGN PATENT DOCUMENTS

| CN | 101029980 A | 9/2007 |
| CN | 102402065 A | 4/2012 |

(Continued)

*Primary Examiner* — Alan B Cariaso
(74) *Attorney, Agent, or Firm* — CKC & Partners Co., LLC

(57) ABSTRACT

A backlight module and a display device are provided. The backlight module includes a back plate, a carrying member, a light guide plate, at least one optical film and a light source. The carrying member is disposed on the back plate, in which the carrying member includes a first step portion and a second step portion, and the first step portion is elevated higher than the second step portion. The light guide plate is disposed on the back plate. The at least one optical film is disposed above the light guide plate, in which the at least one optical film is held on the second step portion. The light source is disposed on the back plate, in which the light source is disposed adjacent to a light-incident surface of the light guide plate.

18 Claims, 7 Drawing Sheets

(56) References Cited

U.S. PATENT DOCUMENTS

2014/0267980 A1   9/2014  Kang et al.
2015/0212261 A1   7/2015  Masuda
2018/0045874 A1*  2/2018  Matsui .................... H01L 33/00

FOREIGN PATENT DOCUMENTS

| | | |
|---|---|---|
| CN | 102606943 A | 7/2012 |
| CN | 203052433 U | 7/2013 |
| CN | 103513449 A | 1/2014 |
| CN | 104049405 A | 9/2014 |
| CN | 204116762 U | 1/2015 |
| CN | 104375323 A | 2/2015 |
| CN | 204666846 U | 9/2015 |
| CN | 204879711 U | 12/2015 |
| TW | 200712630 A | 4/2007 |
| TW | 201423211 A | 6/2014 |
| TW | 201543119 A | 11/2015 |

* cited by examiner

BACKLIGHT MODULE AND DISPLAY DEVICE HAVING THE SAME

RELATED APPLICATIONS

This application is a continuation application of International Application No. PCT/CN2016/090859 filed Jul. 21, 2016, which claims priority to China Application Serial Number 201610485641.X, filed on Jun. 28, 2016, which is incorporated herein by reference.

BACKGROUND

Field of Invention

The present invention relates to a light source module. More particularly, the present invention relates to a backlight module and its applications on a display device.

Description of Related Art

A conventional display device mainly includes a backlight module, a mold frame and a display panel. The display panel is held on the backlight module and is supported by the mold frame. The backlight module mainly includes a back plate, a light guide plate, an optical film and a light source, in which the light guide plate, the optical film and the light source are disposed in the back plate.

Generally, the back plate has a sidewall which surrounds four side edges of the back plate for receiving the light guide plate and the optical film, thereby preventing light leakage problem from the light source. The mold frame is fixed on the sidewall of the back plate and is a frame structure surrounding the sidewall of the back plate. The edge of the mold frame needs to have a certain width for holding the display panel and ensuring the light guide plate and the optical film to be hidden in an inner space of the mold frame. However, this mold frame structure does not fit the design trend of narrow border display device because the border of the display device have to be designed large enough to fit with the edge of the mold frame and the sidewall of the back plate.

SUMMARY

An object of the invention is to provide a backlight module and a display device to meet the design requirement of the narrow border display device.

According to the aforementioned object, a backlight module is provided. The backlight module includes a back plate, a carrying member, a light guide plate, at least one optical film and a light source. The carrying member is disposed on the back plate, in which the carrying member includes a first step portion and a second step portion, and the first step portion is elevated higher than the second step portion. The light guide plate is disposed on the back plate. The optical film is disposed above the light guide plate, in which the optical film is held on the second step portion. The light source is disposed on the back plate, in which the light source is disposed adjacent to a light-incident surface of the light guide plate.

According to an embodiment of the present invention, the back plate has a carrying surface and a sidewall, in which the carrying surface has a side edge, and the sidewall protrudes from the carrying surface. At least one portion of the first step portion is elevated higher than the sidewall, and the second step portion is disposed on the side edge.

According to an embodiment of the present invention, the back plate has a carrying surface, a sidewall and a corner portion, in which the carrying surface has a side edge, and the sidewall protrudes from the carrying surface, and the corner portion is connected to the sidewall and the side edge. The carrying member further includes a body portion, in which the first step portion and the second step portion are connected to the body portion, and the body portion is located between the corner portion and the light guide plate.

According to the aforementioned object, a backlight module is provided. The backlight module includes a back plate, a carrying member, a light guide plate, at least one optical film and a light source. The back plate includes a carrying surface and a sidewall, in which the carrying surface has a side edge extending along a first axis, and the sidewall extends along a second axis and protrudes from the carrying surface. The carrying member is disposed on the side edge of the carrying surface. The light guide plate is disposed on the back plate. The optical film is disposed above the light guide plate, in which a first edge of the optical film which extends along the first axis is held on the carrying member, and a second edge of the optical film which extends along the second axis is held on the sidewall. The light source is disposed on the back plate, in which the light source is disposed adjacent to a light-incident surface of the light guide plate.

According to an embodiment of the present invention, the carrying member includes a first step portion and a second step portion. At least one portion of the first step portion is elevated higher than the sidewall, and the second step portion is disposed on the side edge.

According to an embodiment of the present invention, the back plate has a corner portion, in which the corner portion is connected to the sidewall and the side edge. The carrying member further includes a body portion, a first step portion and a second step portion, in which the first step portion and the second step portion are connected to the body portion, and the body portion is located between the corner portion and the light guide plate.

According to an embodiment of the present invention, the carrying member further includes a connecting portion which is engaged with the corner portion. At least one portion of the first step portion is elevated higher than the sidewall, and the second step portion is disposed on the side edge.

According to an embodiment of the present invention, the optical film has at least one protruding portion and at least one recess, and the at least one protruding portion is connected to a top surface of the second step portion, and at least one recess is corresponding to the body portion of the carrying member.

According to an embodiment of the present invention, a surface of the at least one optical film and a surface of the first step portion are substantially coplanar.

According to an embodiment of the present invention, the second step portion includes more than two carrying portions.

According to an embodiment of the present invention, the carrying portion near the first step is elevated higher than the carrying portion away from the first step portion.

According to the aforementioned object, a display device is provided. The display device includes the aforementioned backlight module, plural adhesive members and a display panel. The adhesive members are adhered on a surface of the at least one optical film and a surface of the carrying member. The display panel is disposed in front of the at least one optical film and is held on the carrying member, in which the display panel are fixed on the backlight module by the adhesive members.

According to the aforementioned embodiments of the present invention, the at least one optical film and the display panel can be held on the carrying member and the sidewall of the back plate, and side edges of the at least one optical film and the display panel are aligned with outer edges of the carrying member and the back plate without implementing the carrying member at one side of the back plate with the sidewall or with implementing the carrying member at another side of the back plate without the sidewall, thereby reducing the overall width of the frame of the backlight module to fit the design trend of the narrow frame of the display device. In addition, the carrying member has the first step portion and the second step portion, and the first step portion is elevated higher than the second step portion so that the display panel can be held on the first step portion as well as the at least one optical film below the display panel can be held on the second step portion, thereby achieving the purpose of supporting the optical film and the display panel simultaneously. In addition, the border of the backlight module can be designed narrower for reason that the carrying member can be used to replace a portion of the sidewall of the back plate, thereby reducing the overall width of the frame of the display device to fit the design trend of the narrow frame of the display device.

BRIEF DESCRIPTION OF THE DRAWINGS

The invention can be more fully understood by reading the following detailed description of the embodiment, with reference made to the accompanying drawings as follows.

DETAILED DESCRIPTION

Figure 1:
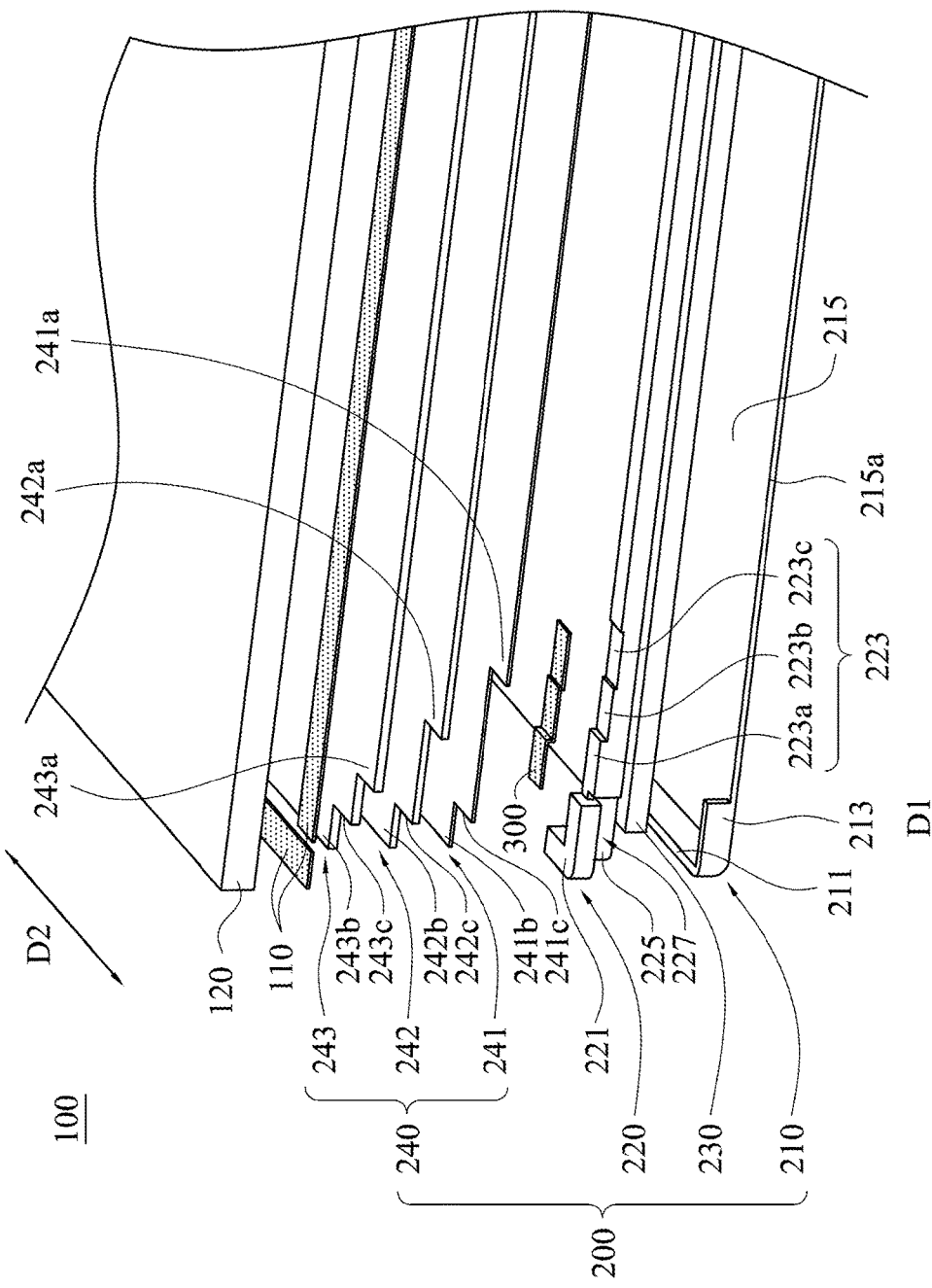
FIG. 1 is a schematic partial exploded view of a display device in accordance with a first embodiment of the present invention.

Reference will now be made in detail to the present embodiments of the invention, examples of which are illustrated in the accompanying drawings. Wherever possible, the same reference numbers are used in the drawings and the description to refer to the same or like parts.

Figure 2:
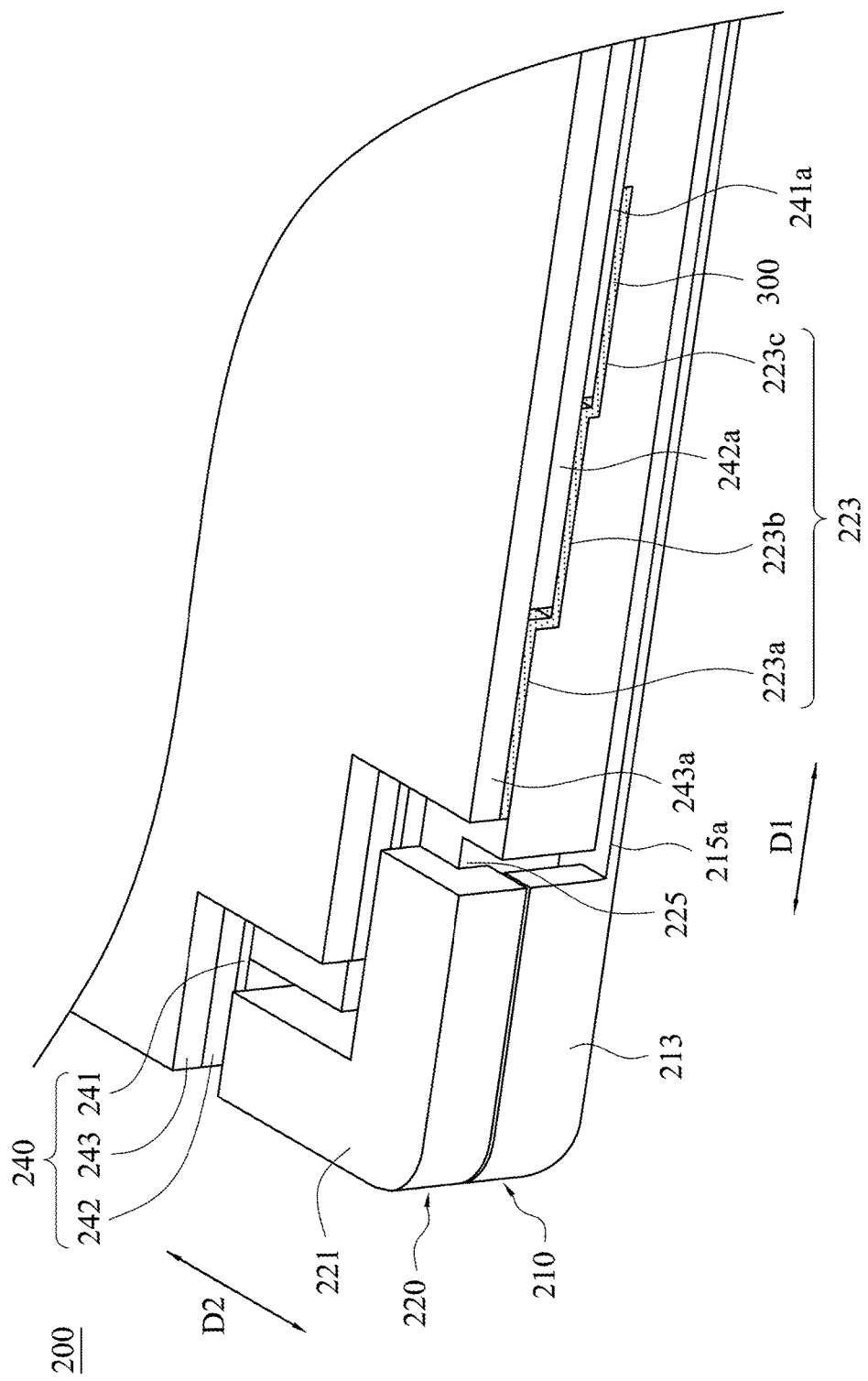
FIG. 2 is a schematic partial structural diagram showing a backlight module in accordance with the first embodiment of the present invention.

Referring to FIG. 1 and FIG. 2, FIG. 1 is a schematic partial exploded view of a display device 100 in accordance with a first embodiment of the present invention, and FIG. 2 is a schematic partial structural diagram showing a backlight module 200 in accordance with the first embodiment of the present invention. The display device 100 mainly includes a backlight module 200, plural adhesive member 110 and a display panel 120. The display panel 120 is adhered to and fixed on the backlight module 200 by the adhesive member 110.

Referring to FIG. 1 and FIG. 2 again, the backlight module 200 mainly includes a back plate 210, a carrying member 220, a light guide plate 230, at least one optical film 240 and a light source (not shown). The carrying member 220, the light guide plate 230 and the light source are disposed on the back plate 210, and the light source is disposed adjacent to a light-incident surface of the light guide plate 230. In the present embodiment, the at least one optical film 240 includes an optical film unit 241, an optical film unit 242 and an optical film unit 243 but not limited. It can also be implemented with only one optical film instead, such as a reverse prism film. In the present embodiment, the carrying member 220 is a stepped structure, and the carrying member 220 is configured to simultaneously support the at least one optical film 240 and the display panel 120. In the present embodiment, the carrying member 220 is disposed adjacent to at least one side surface of the light guide plate 230 instead of the light-incident surface. In addition, the border of the backlight module 200 can be designed narrower for reason that a portion of a sidewall of the back plate 210 can be omitted and be replaced by the carrying member 220, thereby decreasing a frame width of the display device 100.

Figure 3:
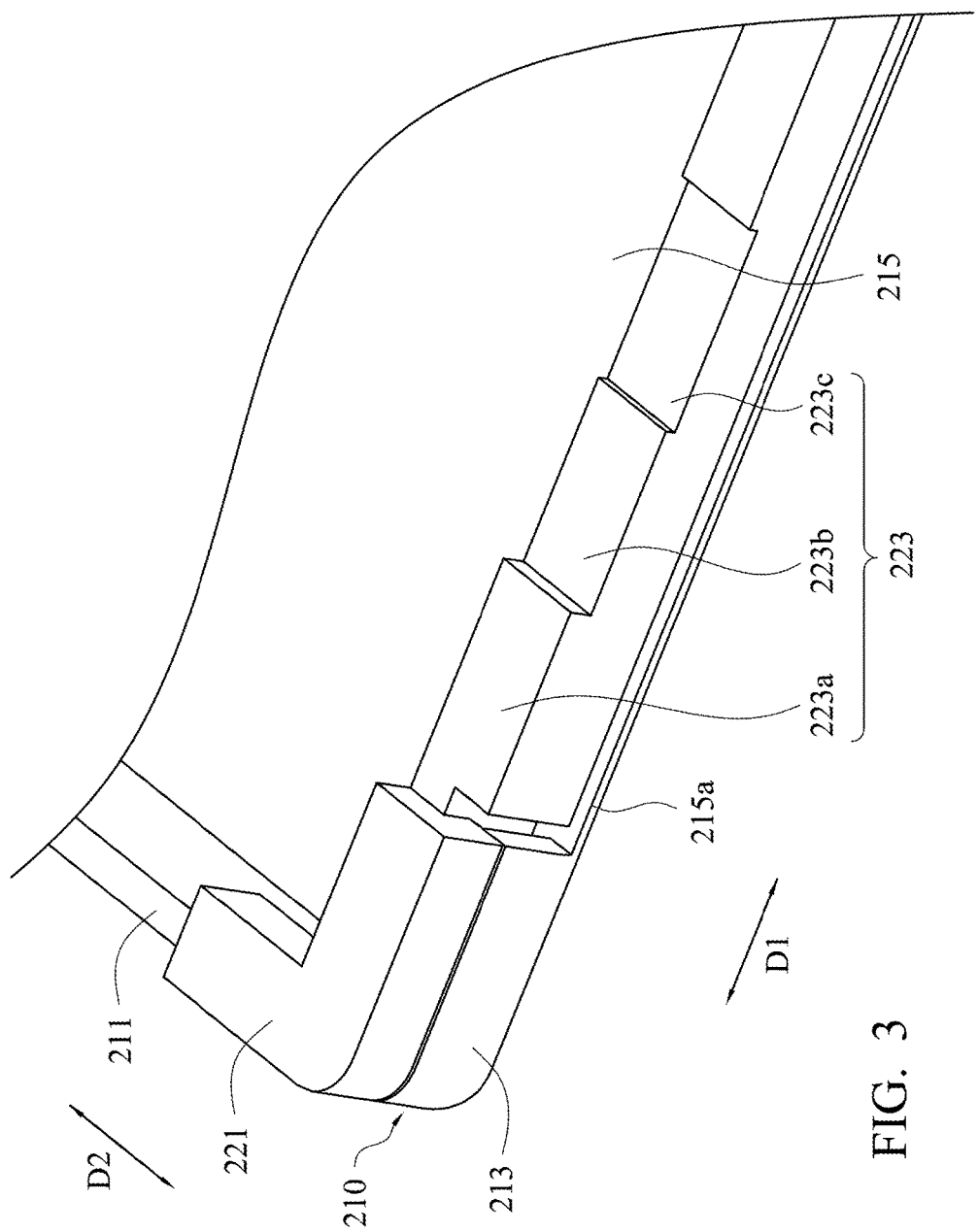
FIG. 3 is a schematic partial structural diagram showing a carrying member disposed on a back plate in accordance with the first embodiment of the present invention.

Simultaneously referring to FIG. 1 to FIG. 3, in which FIG. 3 is a schematic partial structural diagram showing the carrying member 220 disposed on the back plate 210 in accordance with the first embodiment of the present invention. The back plate 210 of the present embodiment has a sidewall 211, a corner portion 213 and a carrying surface 215. The carrying surface 215 has a side edge 215a extending along a first axis D1. The sidewall 211 is protruded from the carrying surface 215 and extends along a second axis D2. In other words, the sidewall 211 is located on a side edge which is parallel to the second axis D2, and there is no sidewall 211 disposed on the side edge 215a which is parallel to the first axis D1. In addition, the corner portion 213 is located between the sidewall 211 and the side edge 215a. In the present embodiment, an extending direction of the second axis D2 is vertical to an extending direction of the first axis D1, but not limited thereto.

Figure 5:
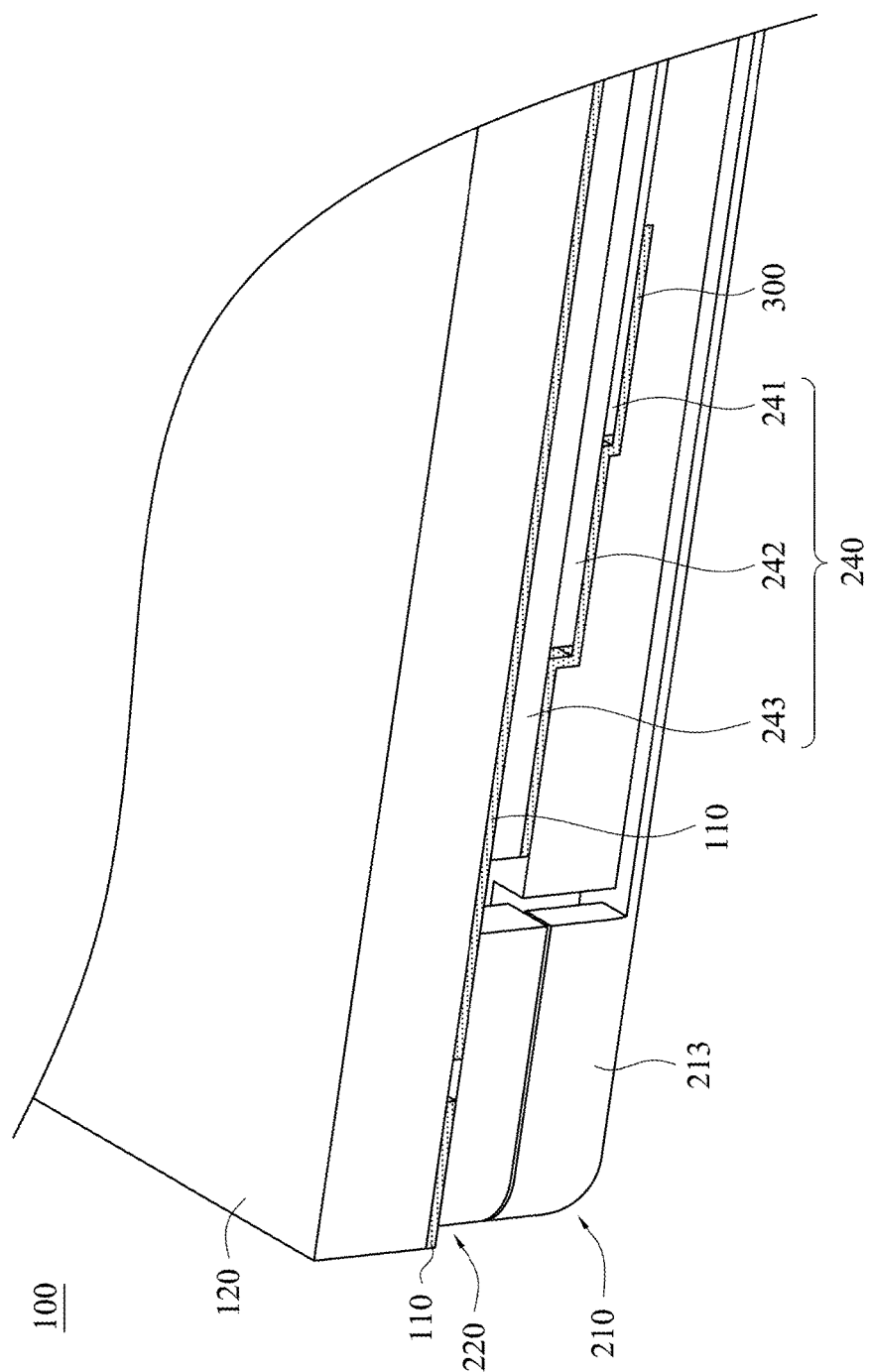
FIG. 5 is a schematic partial structural diagram showing the display device in accordance with the first embodiment of the present invention.

As shown in FIG. 1 and FIG. 3, the carrying member 220 of the present embodiment is disposed on the carrying surface 215 of the back plate 210. The carrying member 220 includes a first step portion 221, a second step portion 223, a body portion 225 and a connecting portion 227. The first step portion 221 and the second step portion 223 are connected to the body portion 225, the connecting portion 227 is a recess defined between the first step portion 221 and the body portion 225. The first step portion 221 is elevated higher than the second step portion 223. In the present embodiment, when the carrying member 220 is disposed on the carrying surface 215, the connecting portion 227 of the carrying member 220 can be engaged with the corner portion 213, and the body portion 225 is located between the corner portion 213 and the light guide plate 230. Moreover, as shown in FIG. 3, at least one portion of the first step portion 221 is elevated higher than the sidewall 211, and at least one portion of the second step portion 223 is disposed on the side edge 215a. As shown in FIG. 1 to FIG. 3, the optical film unit 241, the optical film unit 242, and the optical film unit 243 are held on the second step portion 223, and the display panel 120 is held on the first step portion 221 (as shown in FIG. 5). In the preset embodiment, the first step portion 221 is elevated higher than the second step portion 223, and a height difference between the first step portion 221 and the second step portion 223 is designed according to the number of the optical film unit 241, the optical film unit 242, and the optical film unit 243 as well as an overall thickness of the optical film unit 241, the optical film unit 242, the optical film unit 243, and an adhesive member 300 which is adhered thereon. Therefore, when the optical film unit 241, the optical film unit 242, and the optical film unit 243 are held on the second step portion 223, a top surface of the optical film unit 243 and a surface of the first step portion 221 are substantially coplanar, so that the display panel 120 can be held on the first step portion 221 as well as the optical film unit 241, the optical film unit 242, and the optical film unit 243 stationarily. Accordingly, the carrying member 220 can achieve the objective of simultaneously supporting the optical film unit 241, the optical film unit 242, the optical film unit 243 and the display panel 120.

Referring to FIG. 1 to FIG. 3 again, in the present embodiment, the optical film unit 241, the optical film unit 242, and the optical film unit 243 respectively has a first edge extending along the first axis D1 and a second edge respectively extending along the second axis D2. In one embodiment, the second step portion 223 of the carrying member 220 has more than two carrying portions, in which the height of the carrying portion near the first step portion 221 is greater than that away from the first step portion 221. In one example, the second step portion 223 includes a first carrying portion 223a, a second carrying portion 223b and a third carrying portion 223c, in which the first carrying portion 223a is elevated higher than the second carrying portion 223b, and the second carrying portion 223b is elevated higher than the third carrying portion 223c. The first carrying portion 223a is disposed nearer the first step portion 221 than the second carrying portion 223b, and the second carrying portion 223b is disposed nearer the first step portion 221 than the third carrying portion 223c. The optical film unit 241, the optical film unit 242, and the optical film unit 243 are respectively disposed on the third carrying portion 223c, the second carrying portion 223b, and the first carrying portion 223a.

More specifically, the optical film unit 241 has a protruding portion 241a, a protruding portion 241b and a recess 241c. The protruding portion 241a protrudes along the second axis D2 towards the carrying member 220 and is held on the third carrying portion 223c. The protruding portion 241b protrudes along the first axis D1 towards the sidewall 211 of the back plate 210 and is held on the sidewall 211. Moreover, the recess 241c corresponds to and abuts against the body portion 225 of the carrying member 220. The optical film unit 242 is disposed on the optical film unit 241 and has a protruding portion 242a, a protruding portion 242b and a recess 242c. The protruding portion 242a protrudes along the second axis D2 towards the carrying member 220 and is held on the second carrying portion 223b and the protruding portion 241a of the optical film unit 241. The protruding portion 242b protrudes along the first axis D1 towards the sidewall 211 of the back plate 210 and is held on the sidewall 211 and the protruding portion 241b of the optical film unit 241. Moreover, the recess 242c corresponds to and abuts against the body portion 225 of the carrying member 220. The optical film unit 243 is disposed on the optical film unit 242 and has a protruding portion 243a, a protruding portion 243b and a recess 243c. The protruding portion 243a protrudes along the second axis D2 towards the carrying member 220 and is held on the first carrying portion 223a, the protruding portion 241a of the optical film unit 241 and the protruding portion 242a of the optical film unit 242. The protruding portion 243b protrudes along the first axis D1 towards the sidewall 211 of the back plate 210 and is held on the sidewall 211, the protruding portion 241b of the optical film unit 241 and the protruding portion 242b of the optical film unit 242. Moreover, the recess 243c corresponds to and abuts against the body portion 225 of the carrying member 220.

It is noted that, before disposing the optical film unit 241, the optical film unit 242 and the optical film unit 243, the adhesive member 300 can be first disposed on the first carrying portion 223a, the second carrying portion 223b and the third carrying portion 223c. In one example, the adhesive member 300 is a double-sided tape. Therefore, protruding portion 241a of the optical film unit 241, the protruding portion 242a of the optical film unit 242 and the protruding portion 243a of the optical film unit 243 can be respectively adhered to the third carrying portion 223c, the second carrying portion 223b, and the first carrying portion 223a.

In one example, when the protruding portion 241a of the optical film unit 241 is adhered on the third carrying portion 223c, a top surface of the optical film unit 241 and a surface of the second carrying portion 223b are substantially coplanar. It should be mentioned that, in the embodiment shown in FIG. 2, because the adhesive member 300 disposed on the second carrying portion 223b has a thickness, when the optical film unit 241 is disposed on the third carrying portion 223c, the top surface of the optical film unit 241 and a portion of a surface of the adhesive member 300 located on the second carrying portion 223b can be substantially coplanar. Therefore, when the protruding portion 242a of the optical film unit 242 is adhered on the second carrying portion 223b, the protruding portion 242a of the optical film unit 242 can press against and position to the optical film unit 241

Similarly, in one example, when the protruding portion 242a of the optical film unit 242 is adhered on the second carrying portion 223b, a top surface of the optical film unit 242 and a surface of the first carrying portion 223a are substantially coplanar. It should be mentioned that, in the embodiment shown in FIG. 2, because the adhesive member 300 disposed on the second carrying portion 223b has a thickness, when the optical film unit 242 is disposed on the second carrying portion 223b, the top surface of the optical film unit 242 and a portion of a surface of the adhesive member 300 located on the first carrying portion 223a can be substantially coplanar. Therefore, when the protruding portion 243a of the optical film unit 243 is adhered on the first carrying portion 223a, the protruding portion 243a of the optical film unit 243 can press against and position to the optical film unit 242 and the optical film unit 241.

It is noted that, three optical film units and three carrying portions are merely used as an example for explanation in the present embodiment, the number of the optical film units and the carrying portions may be variable according to different requirements. Moreover, the number of the carrying portions need not be equal to the number of the optical film units, and each of the carrying portions are not limited to support only one optical film unit. The number of the carrying portions can be designed according to the number or the thickness of the optical film units.

Figure 4:
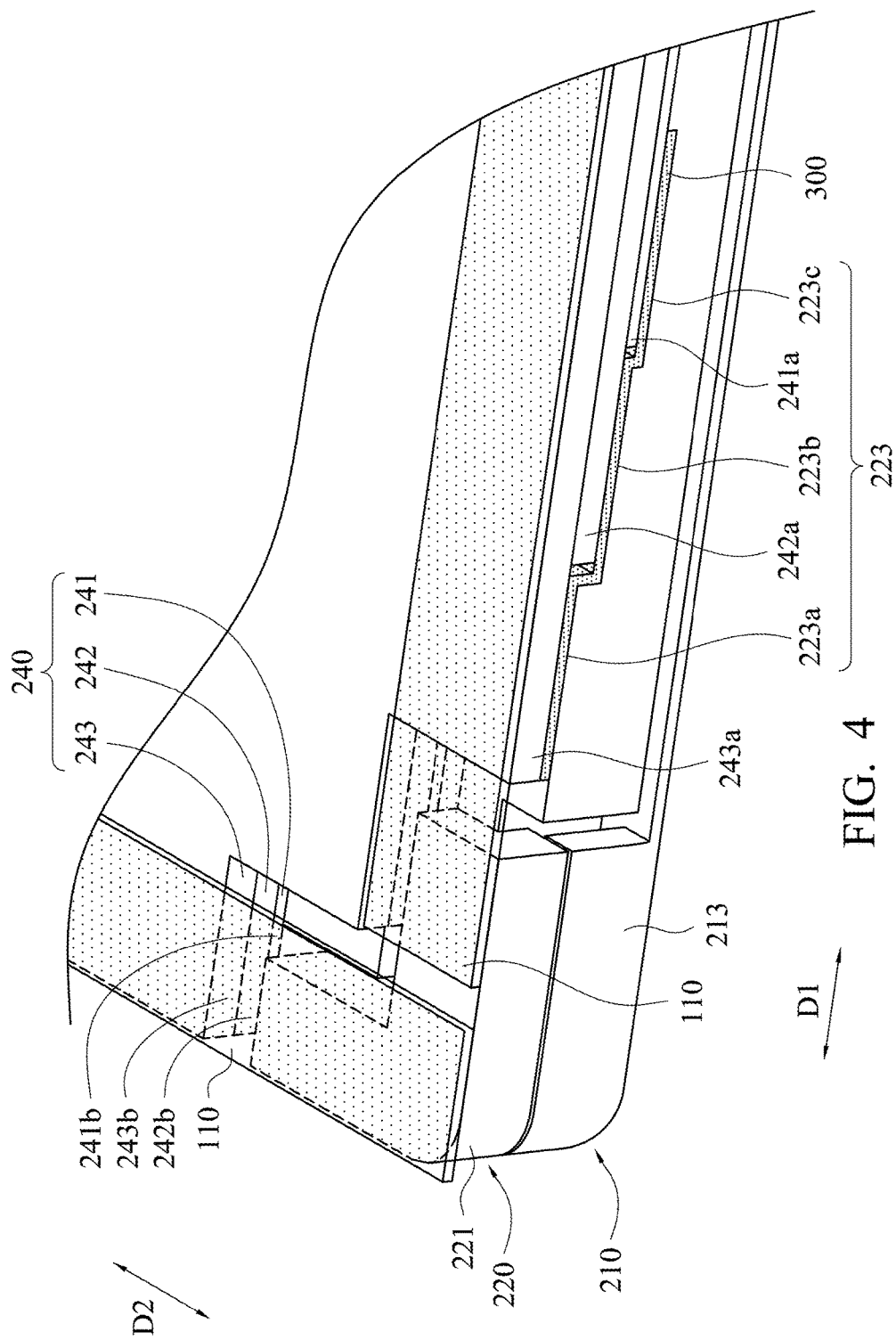
FIG. 4 is a schematic partial structural diagram showing an adhesive member adhered on the backlight module in accordance with the first embodiment of the present invention.

Referring to FIG. 1, FIG. 4 and FIG. 5, in which FIG. 4 is a schematic partial structural diagram showing the adhesive member 110 adhered on the backlight module 200 in accordance with the first embodiment of the present invention, and FIG. 5 is a schematic partial structural diagram showing the display device 100 in accordance with the first embodiment of the present invention. When the protruding portion 243a of the optical film unit 243 is adhered on the first carrying portion 223a, a top surface of the optical film unit 243 and a surface of the first step portion 221 are substantially coplanar. Therefore, as shown in FIG. 4, by adhering the adhesive member 110 on the surface of the first step portion 221 and the surfaces of the protruding portions 243a and 243b simultaneously, the carrying member 220 and the optical film unit 243 can be fixed together. In one example, the adhesive member 110 is a double-sided tape. Therefore, as shown in FIG. 5, the display panel 120 is adhered to and fixed on the at least one optical film 240 and carrying member 220 by using the adhesive member 110.

It is noted that, the carrying member 220 is disposed on a side of the back plate 210 without the sidewall 211. In addition, the at least one optical film 240 and the display panel 120 can be held on the carrying member 220 and the sidewall 211 of the back plate 210, and side edges of the at least one optical film 240 and the display panel 120 are aligned with outer edges of the carrying member 220 and the back plate 210 without implementing the carrying member 220 at one side of the back plate with the sidewall 211 or with implementing the carrying member 220 at another side of the back plate without the sidewall 211, thereby reducing the overall width of the frame of the backlight module 200 to fit the design trend of the narrow frame of the display device.

Figure 6:
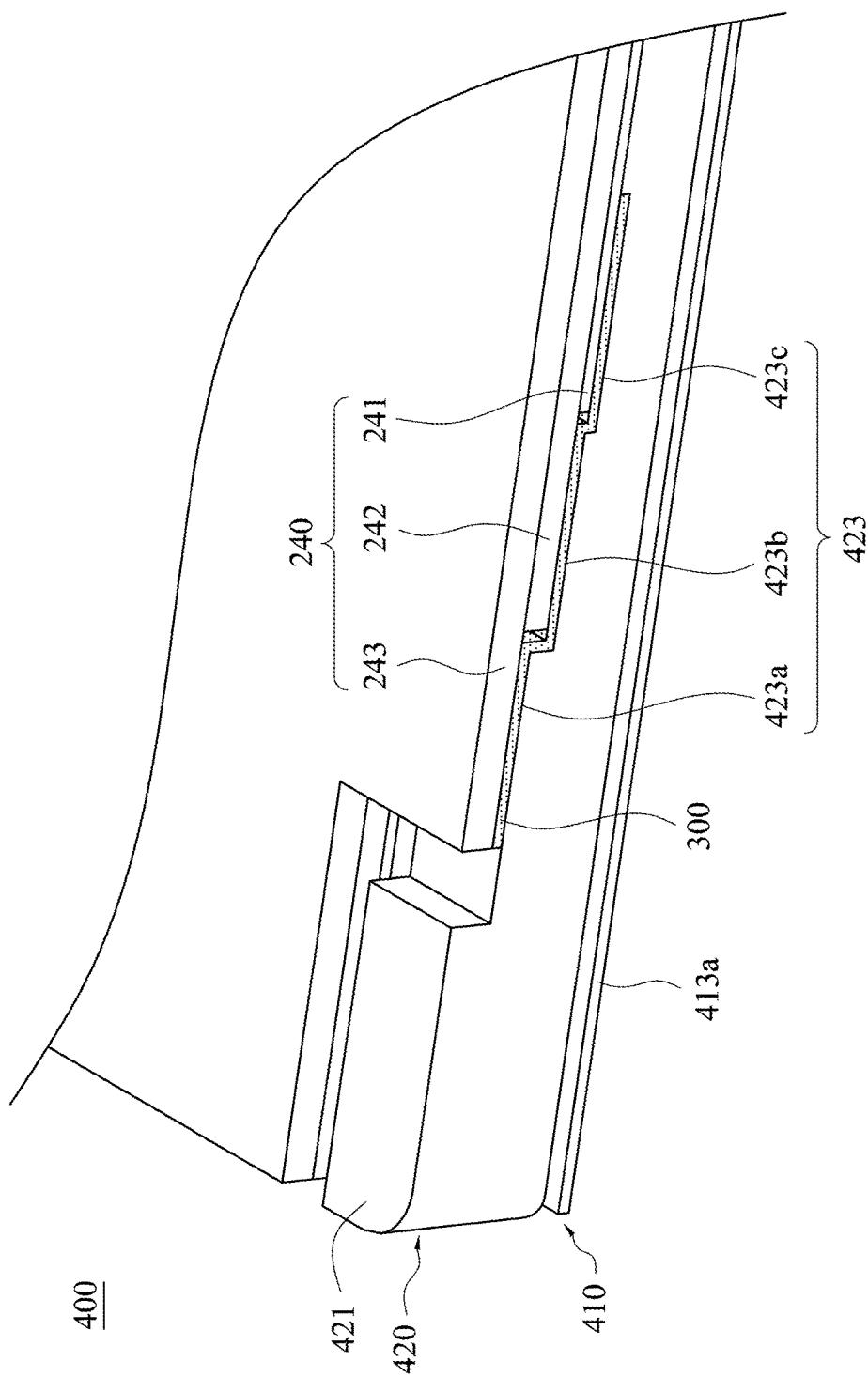
FIG. 6 is a schematic partial structural diagram showing a backlight module in accordance with a second embodiment of the present invention.
Figure 7:
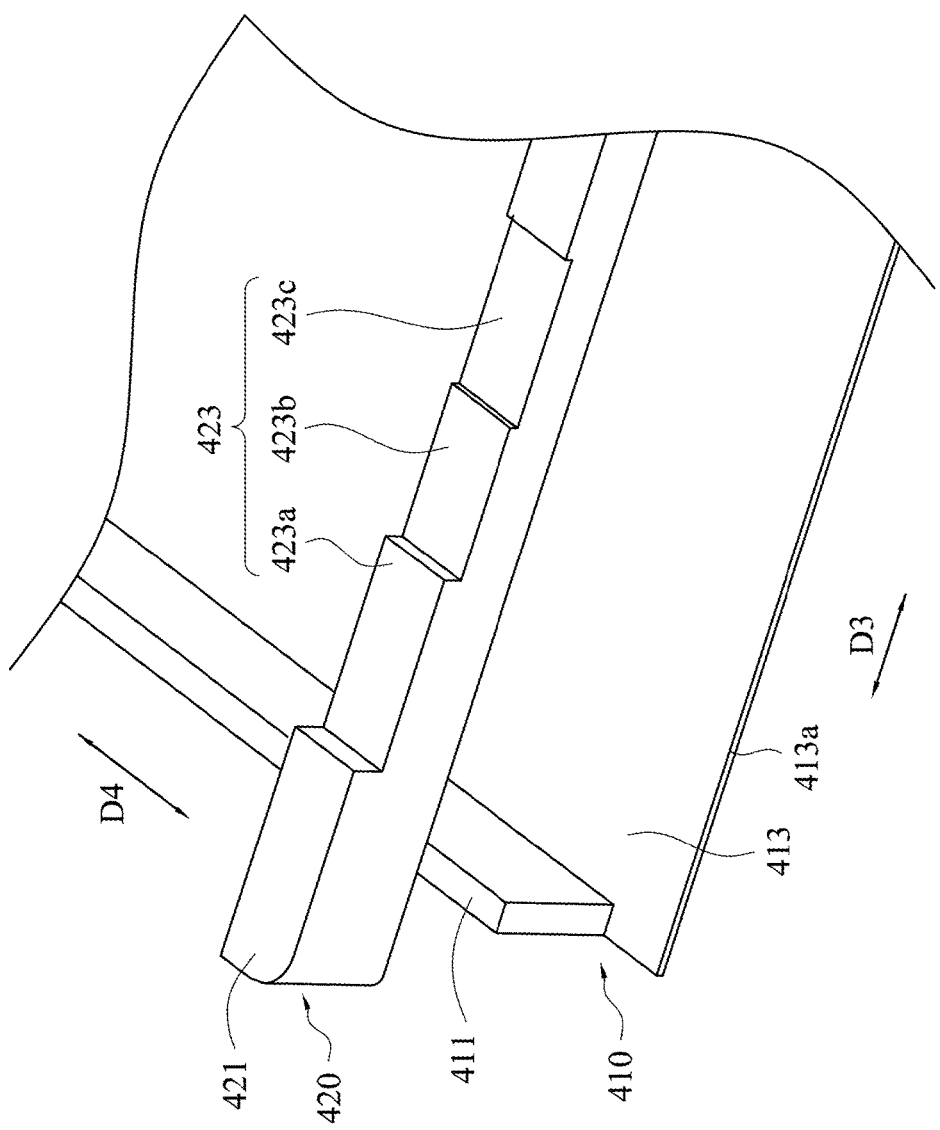
FIG. 7 is a schematic partial exploded view of a carrying member disposed on a back plate in accordance with the second embodiment of the present invention.

In the present invention, the back plate and the carrying member may have different designs. Referring to FIG. 6 and FIG. 7, FIG. 6 is a schematic partial structural diagram showing a backlight module 400 in accordance with a second embodiment of the present invention, and FIG. 7 is a schematic partial exploded view of a carrying member 420 disposed on a back plate 410 in accordance with the second embodiment of the present invention. The structure of the backlight module 400 of the present embodiment is similar to that of the backlight module 200, and the main difference therebetween is that the back plate 410 and the carrying member 420 have different structural designs.

As shown in FIG. 6 and FIG. 7, the back plate 410 does not have the corner portion 213 of the aforementioned back plate 210 and only have a sidewall 411 and a carrying surface 413. The carrying surface 413 has a side edge 413a which extends along a first axis D3. The sidewall 411 is protruded from the carrying surface 413 and extends along a second axis D4. In other words, there is no sidewall disposed on the side edge 413a extending along the first axis D3, and the sidewall 411 is disposed on the side edge which extends along the second axis D4. In the present embodiment, an extending direction of the second axis D4 is vertical to an extending direction of the first axis D3, but not limited thereto.

Referring to FIG. 6 and FIG. 7 again, the carrying member 420 of the present embodiment is disposed on the carrying surface 413 of the back plate 410. The carrying member 420 includes a first step portion 421 and a second step portion 423, and the first step portion 421 is elevated higher than the second step portion 423. In the present embodiment, the carrying member 420 does not have the connecting portion 227 as shown in the aforementioned embodiment, and the carrying member 420 is directly adhered on the carrying surface 413. Moreover, when the carrying member 420 is disposed on the carrying surface 413, at least one portion of the first step portion 421 is elevated higher than the sidewall 411, and at least one portion of the second step portion 423 is located on the side edge 413a. The second step portion 423 can be used to support the optical film unit 241, the optical film unit 242, and the optical film unit 243. And the first step portion 421 can be used to carry the display panel 120 as shown in FIG. 1. In the present embodiment, a height difference between the first step portion 421 and the second step portion 423 is designed according to the number of the optical film unit 241, the optical film unit 242, and the optical film unit 243 as well as an overall thickness of the optical film unit 241, the optical film unit 242, the optical film unit 243, and the adhesive member 300 which is adhered thereon. Therefore, when the optical film unit 241, the optical film unit 242, and the optical film unit 243 are held on the second step portion 423, a surface of the optical film unit 243 and a surface of the first step portion 421 are substantially coplanar, so that the display panel 120 can be held on the first step portion 421 as well as the optical film unit 241, the optical film unit 242, and the optical film unit 243 stationarily.

In one example, the second step portion 423 of the carrying member 420 includes a first carrying portion 423a, a second carrying portion 423b and a third carrying portion 423c. In the present example, the first carrying portion 423a is elevated higher than the second carrying portion 423b, and the second carrying portion 423b is elevated higher than the third carrying portion 423c. Therefore, the optical film unit 241, the optical film unit 242, and the optical film unit 243 can be respectively disposed on the third carrying portion 223c, the second carrying portion 223b, and the first carrying portion 223a, so that side edges of the at least one optical film 240 and the display panel 120 are aligned with outer edges of the carrying member 420 and the back plate 210 without implementing the carrying member 420 at one side of the back plate with the sidewall 411 or with implementing the carrying member 420 at another side of the back plate without the sidewall 411, thereby reducing the overall width of the frame of the backlight module 400. It is noted that, three optical film 240 and three second step portion 423 are merely used as an example for explanation in the present embodiment, the number of the optical film 240 and the second step portion 423 may be variable according to different requirements. Similarly, the shapes of the optical film 240 can be designed according to the shapes of the carrying member 220 and 420.

According to the aforementioned embodiments of the present invention, the at least one optical film and the display panel can be held on the carrying member and the sidewall of the back plate, and side edges of the at least one optical film and the display panel are aligned with outer edges of the carrying member and the back plate without implementing the carrying member at one side of the back plate with the sidewall or with implementing the carrying member at another side of the back plate without the sidewall, thereby reducing the overall width of the frame of the backlight module to fit the design trend of the narrow frame of the display device. In addition, the carrying member has the first step portion and the second step portion, and the first step portion is elevated higher than the second step portion so that the display panel can be held on the first step portion as well as the at least one optical film below the display panel can be held on the second step portion, thereby achieving the purpose of supporting the optical film and the display panel simultaneously. In addition, the border of the backlight module can be designed narrower for reason that the carrying member can be used to replace a portion of the sidewall of the back plate, thereby reducing the overall width of the frame of the display device to fit the design trend of the narrow frame of the display device.

Although the present invention has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims.

What is claimed is:

1. A backlight module, comprising:
   a back plate;
   a carrying member disposed on the back plate, wherein the carrying member comprises a first step portion and a second step portion, and the first step portion is elevated higher than the second step portion, wherein the second step portion comprises more than two carrying portions;
   a light guide plate disposed on the back plate;
   at least one optical film disposed above the light guide plate, wherein the at least one optical film is held on the second step portion; and
   a light source disposed on the back plate, wherein the light source is disposed adjacent to a light-incident surface of the light guide plate;
   wherein the back plate has a carrying surface and a sidewall, wherein the carrying surface has a side edge, and the sidewall protrudes from the carrying surface; and
   wherein at least one portion of the first step portion is elevated higher than the sidewall, and the second step portion is disposed on the side edge.

2. The backlight module of claim 1, wherein a surface of the at least one optical film and a surface of the first step portion are substantially coplanar.

3. The backlight module of claim 1, wherein the carrying portion near the first step portion is elevated higher than the carrying portion away from the first step portion.

4. A display device, comprising:
   a backlight module of claim 1;
   a plurality of adhesive members adhered on a surface of the at least one optical film and a surface of the first step portion; and
   a display panel disposed in front of the at least one optical film and held on the first step portion of the carrying member, wherein the display panel are fixed on the backlight module by the adhesive members.

5. A backlight module, comprising:
   a back plate comprising a carrying surface and a sidewall, wherein the carrying surface has a side edge extending along a first axis, and the sidewall extends along a second axis and protrudes from the carrying surface;
   a carrying member disposed on the side edge of the carrying surface;
   a light guide plate disposed on the back plate;
   at least one optical film disposed above the light guide plate, wherein a first edge of the at least one optical film which extends parallel to the first axis is held on the carrying member, and a second edge of the at least one optical film which extends along the second axis is held on the sidewall;
   a light source disposed on the back plate, wherein the light source is disposed adjacent to a light-incident surface of the light guide plate.

6. The backlight module of claim 5, wherein
   the carrying member comprises a first step portion and a second step portion; and
   at least one portion of the first step portion is elevated higher than the sidewall, and the second step portion is disposed on the side edge.

7. The backlight module of claim 6, wherein the at least one optical film comprises at least one protruding portion and at least one recess, and the at least one protruding portion is connected to a top surface of the second step portion, and at least one recess is corresponding to the first step portion.

8. The backlight module of claim 6, wherein a surface of the at least one optical film and a surface of the first step portion are substantially coplanar.

9. The backlight module of claim 6, wherein the second step portion comprises more than two carrying portions.

10. The backlight module of claim 9, wherein the carrying portion near the first step is elevated higher than the carrying portion away from the first step portion.

11. The backlight module of claim 5, wherein
   the back plate has a corner portion, wherein the corner portion is connected to the sidewall and the side edge; and
   the carrying member further comprises a body portion, a first step portion and a second step portion, wherein the first step portion and the second step portion are connected to the body portion, and the body portion is located between the corner portion and the light guide plate.

12. The backlight module of claim 11, wherein the carrying member further comprises a connecting portion which is engaged with the corner portion and at least one portion of the first step portion is elevated higher than the sidewall, and the second step portion is disposed on the side edge.

13. The backlight module of claim 11, wherein the at least one optical film has at least one protruding portion and at least one recess, and the at least one protruding portion is connected to a top surface of the second step portion, and at least one recess is corresponding to the body portion of the carrying member.

14. The backlight module of claim 11, wherein a surface of the at least one optical film and a surface of the first step portion are substantially coplanar.

15. A display device, comprising:
   a backlight module of claim 5;
   a plurality of adhesive members adhered on a surface of the at least one optical film and a surface of the carrying member; and
   a display panel disposed in front of the at least one optical film and held on the carrying member, wherein the display panel are fixed on the backlight module by the adhesive members.

16. A backlight module, comprising:
   a back plate;
   a carrying member disposed on the back plate, wherein the carrying member comprises a first step portion and a second step portion, and the first step portion is elevated higher than the second step portion, wherein the second step portion comprises more than two carrying portions;
   a light guide plate disposed on the back plate;
   at least one optical film disposed above the light guide plate, wherein the at least one optical film is held on the second step portion; and
   a light source disposed on the back plate, wherein the light source is disposed adjacent to a light-incident surface of the light guide plate;

wherein the back plate has a carrying surface, a sidewall and a corner portion, wherein the carrying surface has a side edge, and the sidewall protrudes from the carrying surface, and the corner portion is connected to the sidewall and the side edge; and wherein the carrying member further comprises a body portion, wherein the first step portion and the second step portion are connected to the body portion, and the body portion is located between the corner portion and the light guide plate.

17. The backlight module of claim 16, wherein the carrying member further comprises a connecting portion which is engaged with the corner portion, and at least one portion of the first step portion is elevated higher than the sidewall, and the second step portion is disposed on the side edge.

18. The backlight module of claim 16, wherein the at least one optical film has at least one protruding portion and at least one recess, and the at least one protruding portion is connected to a top surface of the second step portion, and at least one recess is corresponding to the body portion of the carrying member.

* * * * *